E. WING.
BAKING PAN.
APPLICATION FILED MAY 16, 1910.

987,525.

Patented Mar. 21, 1911.

Witnesses:

Inventor
Esther Wing
By G. H. Strong.
Her Attorney.

UNITED STATES PATENT OFFICE.

ESTHER WING, OF EUREKA, CALIFORNIA.

BAKING-PAN.

987,525.　　　Specification of Letters Patent.　Patented Mar. 21, 1911.

Application filed May 16, 1910. Serial No. 561,527.

*To all whom it may concern:*

Be it known that I, ESTHER WING, citizen of the United States, residing at Eureka, in the county of Humboldt and State of California, have invented new and useful Improvements in Baking-Pans, of which the following is a specification.

This invention relates to cooking utensils and particularly pertains to a baking-pan for molding and baking crusts and pastry shells for pies and the like.

It is the object of this invention to provide a pie-crust baking-pan, by means of which a pastry shell may be formed and baked previous to the introduction of the pie filling.

A further object is to provide a pie-crust molding and baking-pan in which the crust will be of even thickness and which is so designed as to insure thorough and equal baking of the crust throughout.

Another object is to provide a pie-crust baking-pan which after the crust has been baked, may be utilized as an ordinary baking-pan for holding the pie-shell while filling with the pie material, or for further heating or baking the pie when filled.

The invention consists of the parts and the construction and combination of parts as hereinafter more fully described and claimed, having reference to the accompanying drawings, in which—

Figure 1:
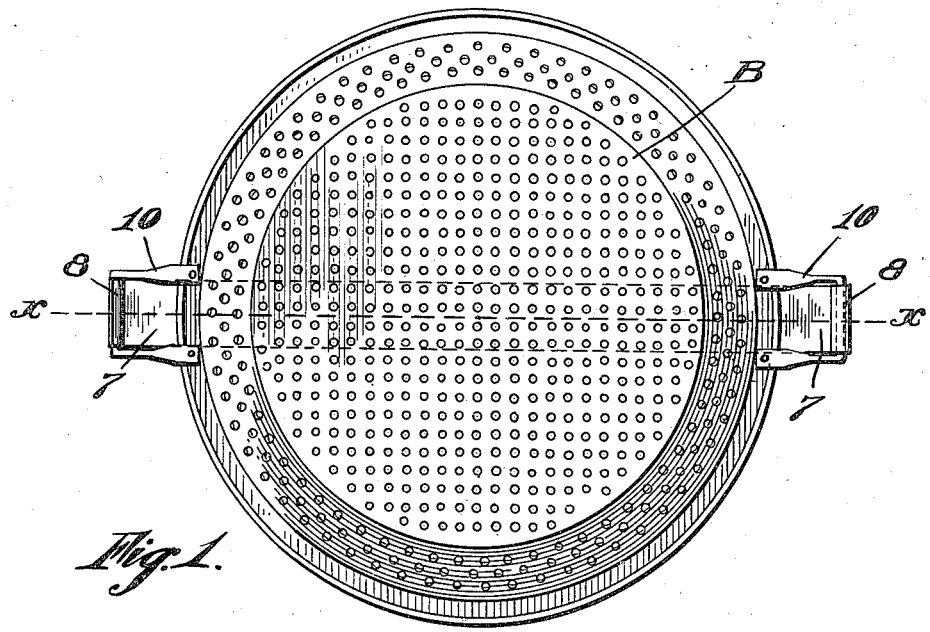
Figure 2:
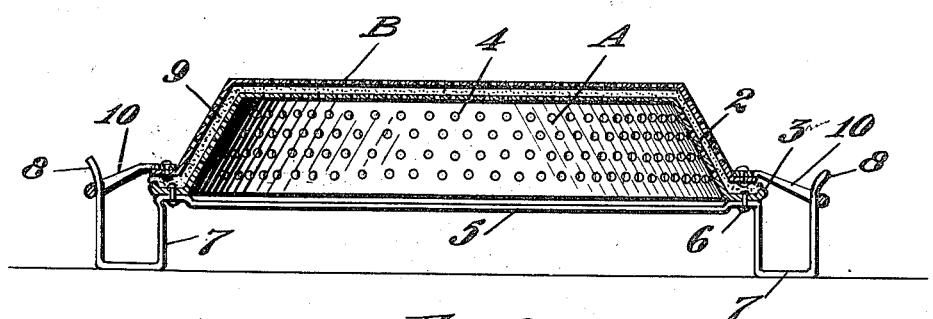

Figure 1 is a plan view of the invention. Fig. 2 is a sectional view on the line X X, Fig. 1.

In the drawings A represents an inverted pan which may be of any suitable size and shape, but which is here shown as circular with flared sides 2 having a beaded rim 3.
The bottom and the flared sides 2 of the inverted pan A are preforated with a suitable number of small openings or holes 4, thus providing a reticulated surface through which heat will quickly pass. A metal strip 5 extends crosswise beneath the inverted pan A and is secured to the beaded rim 3 by suitable means, as rivets 6, the ends of the strip 5 being bent downwardly and outwardly to form legs 7 for supporting the pan A in an elevated position, thence are turned upwardly to form spring-engaging members 8 on diametrically opposite sides of the perforated pan A. Another pan B, conforming to the shape and design of the pan A and likewise perforated, is adapted to be placed in inverted position over the pan A. The pan B is of a trifle larger diameter than the pan A, so as partially to telescope over or nest with the latter and to form therewith an intervening baking chamber or open space for the pastry represented at 9, Fig. 2. Projecting handles 10 are provided on diametrically opposite sides of the pan B, which handles are adapted to be engaged by the spring members 8 formed on the legs 7 of the pan A to lock the two pans together and also form handles therewith to handle the pan B.

In operation, the rolled or unbaked dough is placed in a sheet over the pan A so as to extend over the bottom thereof and down the outside of the flared sides 2 over the beaded rim 3, as shown at 9, Fig. 2. The pan B is then placed over the dough on the pan A and is clamped thereon by means of the handles 10, springs 8 pressing the dough between the two pans A and B to mold it in the required pan-like form and of even thickness. The surplus dough squeezed out around the rims of the pans is readily removed with a knife in the usual manner, the baker using the metal strip 5 as a hand-hold in handling the pan.

In baking, the pans A and B joined together as just described are placed in an oven in the position shown in Fig. 2, the legs 7 resting on the oven bottom and supporting the pans in an elevated position so that the heated air of the oven will have a perfectly free circulation beneath and around the pan. The perforations in the pans A and B permit of the heat quickly reaching the dough between the two pans, and thereby insures a rapid and thorough baking of the crust. When the baking has been finished the pan is removed from the stove and inverted. The pan B is then separated from the pan A by pressing in the spring-engaging members 8 and releasing the handles 10 therefrom. The baked crust remains in the pan B where it can be conveniently filled with any desired pie materials and replaced in the oven in the pan B in the ordinary manner for further heating or cooking, if desired.

Having thus described my invention, what I claim and desire to secure by Letters Patent is—

1. A device for cooking hollow pastry shells, which comprises a pan with an elevated bottom and a peripheral flange, means secured to the under side of the flange supporting the pan to allow a circulation of heat up into the pan, said supporting means having yielding projections, a second pan of corresponding cross-section partially telescoping and nesting with the first pan and spaced therefrom to inclose a baking space, and handles on the top pan engageable with the yielding projections on said supporting means.

2. A cooking utensil comprising a perforated, inverted pan, a metal strip secured across the under side of the pan and having its ends bent downwardly to form supporting means, and then bent upwardly to form spring catches, and a second perforated, inverted pan nesting loosely over the first named pan and partially separated therefrom to inclose a baking space and having handles engageable with said spring members to lock the two pans together.

In testimony whereof I have hereunto set my hand in the presence of two subscribing witnesses.

ESTHER WING.

Witnesses:
J. F. QUINN,
C. W. WINN.